Figure 2:
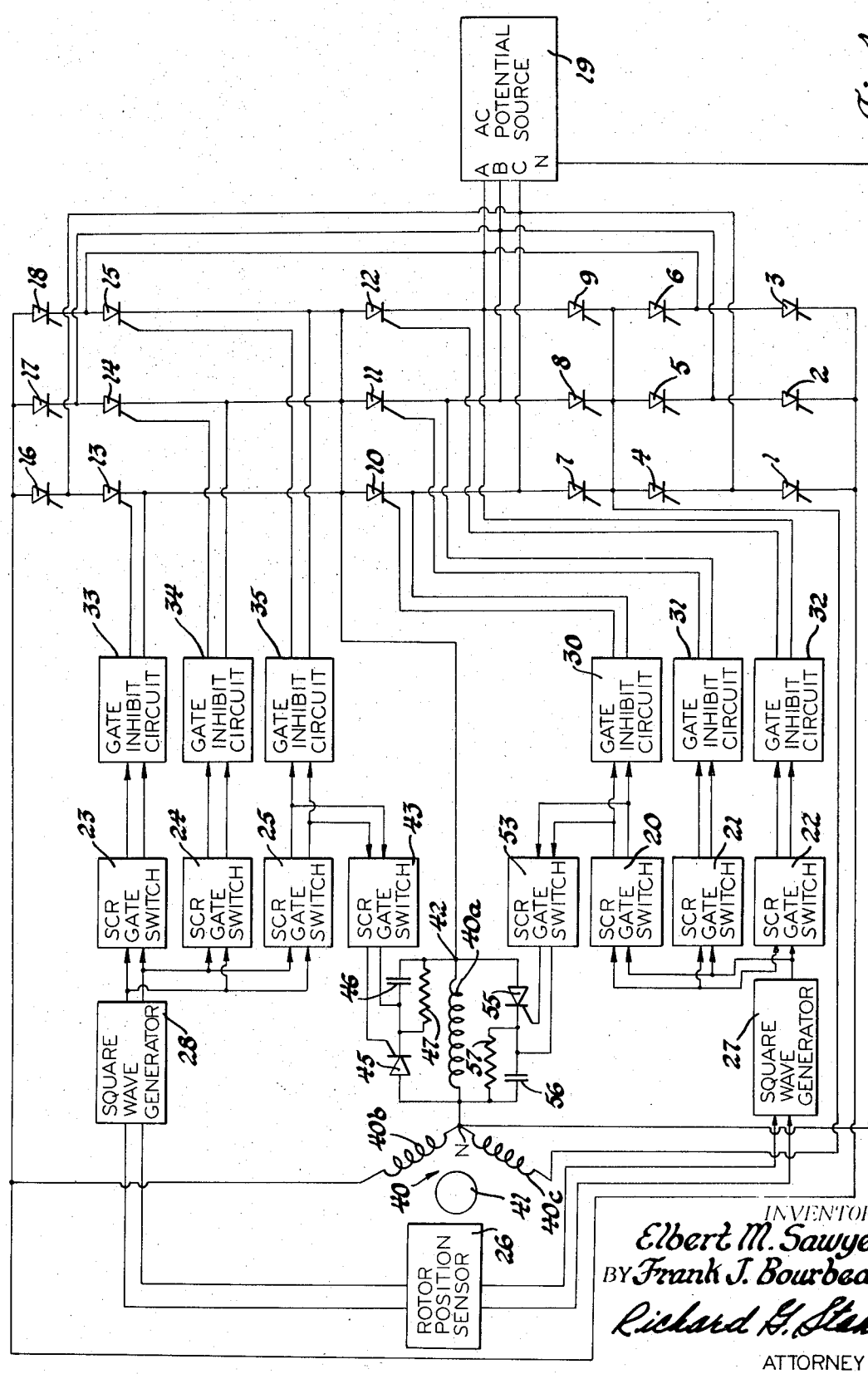
Figure 2:
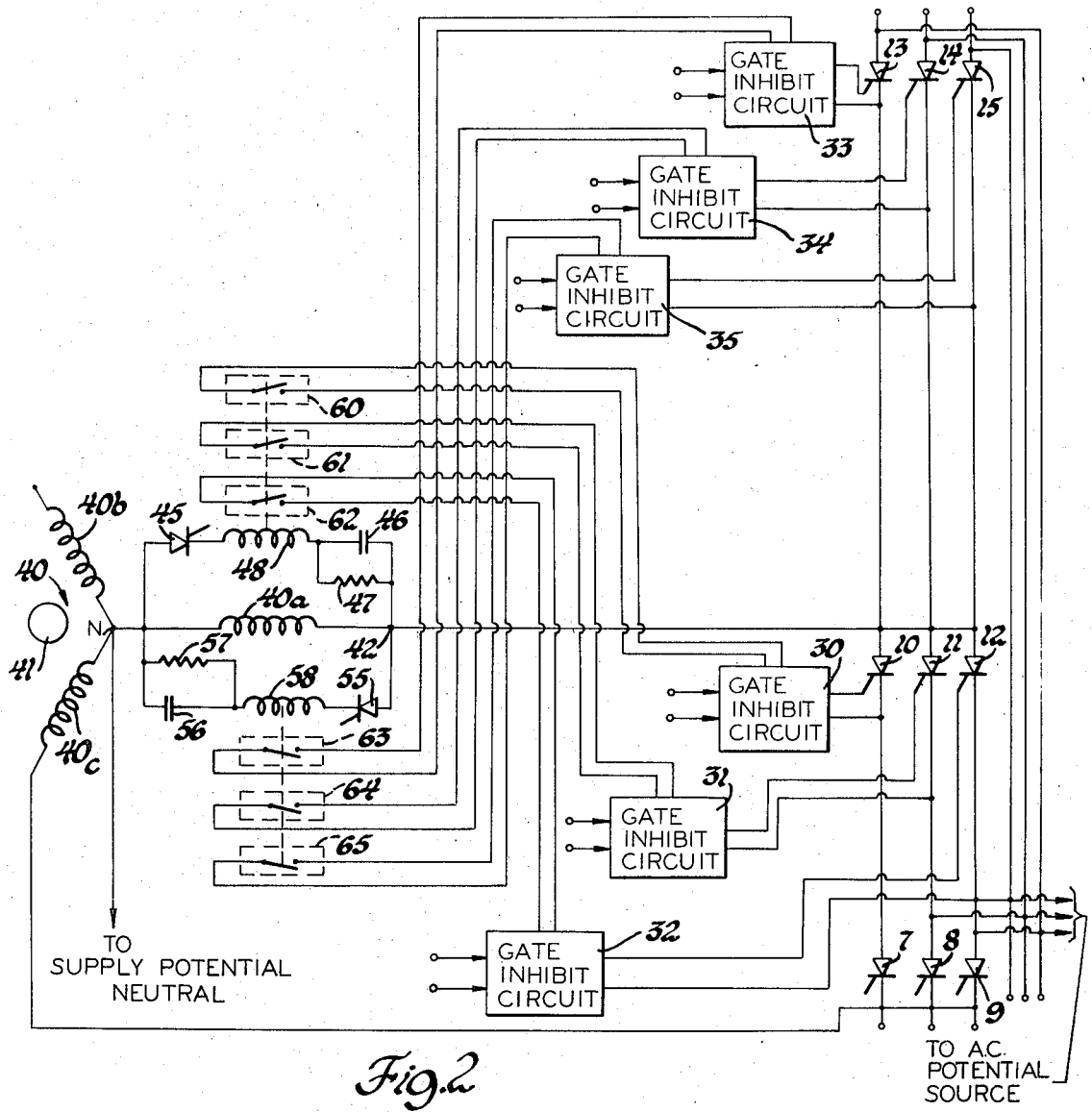

United States Patent

Sawyer et al.

[15] 3,689,813
[45] Sept. 5, 1972

[54] CYCLOCONVERTER SILICON CONTROLLED RECTIFIER GATE SIGNAL DELAY CIRCUIT

[72] Inventors: Elbert M. Sawyer, Torrance; Frank J. Bourbeau, Santa Barbara, both of Calif.

[73] Assignee: General Motors Corporation, Detroit, Mich.

[22] Filed: July 13, 1971

[21] Appl. No.: 162,243

[52] U.S. Cl. .................318/227, 318/230, 318/231
[51] Int. Cl. ........................................H02p 5/40
[58] Field of Search..................318/227, 230, 231

[56] References Cited

UNITED STATES PATENTS

| | | |
|---|---|---|
| 3,602,787 | 8/1971 | Tuchen......................318/227 |
| 3,624,472 | 11/1971 | Graham......................318/227 |

*Primary Examiner*—Gene Z. Rubinson
*Attorney*—Eugene W. Christen et al.

[57] ABSTRACT

A cycloconverter silicon controlled rectifier gate signal delay circuit for delaying the application of cycloconverter silicon controlled rectifier gate signals to the cycloconverter silicon controlled rectifiers next to be gated conductive to energize, in the opposite direction, a phase winding of a cycloconverter operated motor through which conduction has just been terminated. The anode-cathode electrodes of each of two oppositely poled silicon controlled rectifiers are connected in series with a coil and the parallel combination of a resistor and a capacitor across each phase winding of the motor. When conduction is to be terminated through a phase winding, the silicon controlled rectifier connected thereacross which is forward poled by the potential induced in the phase winding as the magnitude of phase current flow therethrough decreases is gated conductive. Respective magnetically operated reed-type switches, magnetically coupled to the magnetic field produced by the flow of current through the coil connected in series with the conducting silicon controlled rectifier, operate to delay the application of the cycloconverter gate signal to each of the cycloconverter silicon controlled rectifiers next to be gated conductive to energize the same phase winding of the motor in the opposite direction until phase current has reduced to substantially zero.

4 Claims, 3 Drawing Figures

PATENTED SEP 5 1972 3,689,813

SHEET 2 OF 2

INVENTORS
Elbert M. Sawyer &
BY Frank J. Bourbeau

Richard G. Stahl
ATTORNEY

CYCLOCONVERTER SILICON CONTROLLED RECTIFIER GATE SIGNAL DELAY CIRCUIT

The invention herein described was made in the course of work under contract or subcontract thereunder with the Department of Defense.

This invention is directed to a cycloconverter silicon controlled rectifier gate signal delay circuit for delaying the application of cycloconverter silicon controlled rectifier gate signals to the cycloconverter silicon controlled rectifiers next to be gated conductive to energize, in the opposite direction, a phase winding of a cycloconverter operated alternating current motor through which conduction has just been terminated.

In cycloconverter systems for cyclically energizing the phase windings of an alternating current motor from an alternating current supply potential source, each phase of the supply potential source supplies current to each phase winding of the motor in a first direction through a cycloconverter silicon controlled rectifier and in a second opposite direction through another oppositely poled cycloconverter silicon controlled rectifier. Consequently, for each phase of the alternating current supply potential source, there is a corresponding cycloconverter silicon controlled rectifier having the cathode electrode connected to one terminal end of each phase winding of the motor through which current is supplied thereto in a first direction and a corresponding cycloconverter silicon controlled rectifier having the anode electrode connected to the same terminal end of each phase winding of the motor through which current is supplied thereto in a second opposite direction. For example, with a three-phase cycloconverter system in which a three-phase alternating current motor is supplied from a three-phase supply potential source, the cathode electrode of each of three cycloconverter silicon controlled rectifiers, generally termed the common cathode group, and the anode electrode of each of three other cycloconverter silicon controlled rectifiers, generally termed the common anode group, are connected to the same terminal end of each phase winding of the motor. In operation, gate signals are simultaneously applied across and removed from the gate-cathode electrodes of all of the cycloconverter silicon controlled rectifiers of each group.

One factor which limits the amount of current supplied the motor, thus the torque produced by the motor, with cycloconverter systems is the energy stored in each phase winding of the motor at the time conduction therethrough is terminated. As the current supplied a phase winding of the motor begins to decrease when the alternating current supply potential magnitude decreases toward zero, the inductance of the phase winding tends to maintain phase current flow in the same direction. This will cause the phase current to continue to flow in the same direction even though the supply potential across the anode-cathode electrodes of the cycloconverter silicon controlled rectifier through which phase current is supplied is of a polarity which would normally commutate the cycloconverter silicon controlled rectifier OFF because the potential induced in the phase winding controls the net cycloconverter silicon controlled rectifier potential until the energy stored in the phase winding has decreased to a low value. At the conclusion of the conduction period through the group of cycloconverter silicon controlled rectifiers through which current is being supplied, this delay of the decay or fall of phase current, which may continue for several cycles of the supply potential depending upon the magnitude of the energy stored in the motor phase winding, delays the actual turn-off of the last conducting cycloconverter silicon controlled rectifier of the group at the time the gate signals are removed. Consequently, this device will continue to conduct until the energy stored in the phase winding of the motor has been dissipated. If this stored energy causes the phase current to persist, or hang on long enough, a line-to-line short, or fault, will be produced thereby at the 180° point when the gate signals are applied across the gate-cathode electrodes of the cycloconverter silicon controlled rectifiers of the group through which current is supplied in the opposite direction to that phase winding of the motor. To prevent the energy stored in each phase winding of the motor from causing a cycloconverter silicon controlled rectifier to hang on and create a line-to-line fault, it is necessary to accelerate the decay of phase current in each motor phase winding. This may be accomplished by dissipating the potential induced in each phase winding of the motor upon the termination of conduction therethrough. By rapidly dissipating this induced potential, the maximum motor current and, consequently, the maximum motor torque, may be significantly increased without resulting in a line-to-line fault due to motor phase current persisting to or beyond the 180° point.

A circuit for dissipating the potential induced in each phase winding of a cycloconverter operated motor upon the termination of conduction therethrough has been developed wherein the anode-cathode electrodes of each of two oppositely poled silicon controlled rectifiers are connected in series with a respective parallel combination of a resistor and a capacitor across each phase winding of the motor. When conduction through each phase winding in either direction is to be terminated, a gate signal is produced and applied across the gate-cathode electrodes of the one of the silicon controlled rectifiers connected across the phase winding through which conduction is to be terminated which is forward poled by the potential induced in the phase winding as the magnitude of phase current flow therethrough decreases. As the phase current through each phase winding of the motor decreases over the last 90° of each half cycle of the alternating current supply potential, a potential is induced in the phase winding of a polarity which will tend to maintain phase current flow in the same direction and which will forward pole the anode-cathode electrodes of one of the silicon controlled rectifiers connected thereacross. Near the end of each half cycle of the alternating current supply potential when conduction in either direction through each phase winding of the motor is to be terminated, the cycloconverter silicon controlled rectifier gate signals are removed from the cycloconverter silicon controlled rectifiers of the group supplying current to that phase winding to terminate conduction therethrough and the gate signal is applied across the gate-cathode electrodes of the silicon controlled rectifier connected across that phase winding which is forward poled by the induced potential to trigger this device conductive. The conducting silicon controlled rectifier establishes a circuit through which the induced potential charges the associated capacitor, which is later dissipated through the parallel resistor, and shunts substantially all of the phase current around that motor phase winding. This circuit has been shown and described in detail in copending application, Ser. No. 159228, filed July 2, 1971, and assigned to the same assignee as is this application. Although a significant increase of maximum motor current may be attained with this circuit, to realize substantially all of the current that can be commutated without creating a line-to-line short circuit or fault, it is necessary that the phase current of each motor winding through which conduction has been terminated be substantially zero before the cycloconverter silicon controlled rectifier gate signals are applied to the cycloconverter silicon controlled rectifiers next to be gated conductive to energize the same phase winding in the opposite direction. Therefore, a circuit arrangement which detects a substantially zero phase current for any phase winding of a cycloconverter operated motor and delays the application of the cycloconverter silicon controlled rectifier gate signals to the cycloconverter silicon controlled rectifiers next to be gated conductive to energize the phase winding in an opposite direction is desirable.

It is, therefore, an object of this invention to provide a cycloconverter silicon controlled rectifier gate signal delay circuit for delaying the application of cycloconverter silicon controlled rectifier gate signals to the cycloconverter silicon controlled rectifiers next to be gated conductive to energize, in the opposite direction, a phase winding of a cycloconverter operated motor through which conduction has just been terminated until the phase current has reduced to substantially zero.

In accordance with this invention, a circuit for delaying the application of cycloconverter silicon controlled rectifier gate signals to the cycloconverter silicon controlled rectifiers next to be gated conductive to energize, in the opposite direction, a phase winding of a cycloconverter operated alternating current motor through which conduction has just been terminated is provided wherein the anode-cathode electrodes of each of two oppositely poled silicon controlled rectifiers are connected in series with a coil and the parallel combination of a resistor and a capacitor across each phase winding of the motor and a gate signal, produced when conduction through each one of the phase windings is to be terminated, gates conductive the one of the silicon controlled rectifiers connected across the phase winding of the motor through which conduction is to be terminated which is forward poled by the potential induced in the phase winding as phase current flow therethrough decreases to complete an energizing circuit for the series coil which operates respective magnetically operated reed-type switches, magnetically coupled thereto, to delay the application of the cycloconverter gate signal to each of the cycloconverter silicon controlled rectifiers next to be gated conductive to energize the same phase winding of the motor in the opposite direction until phase current has reduced to substantially zero.

Figure 3:
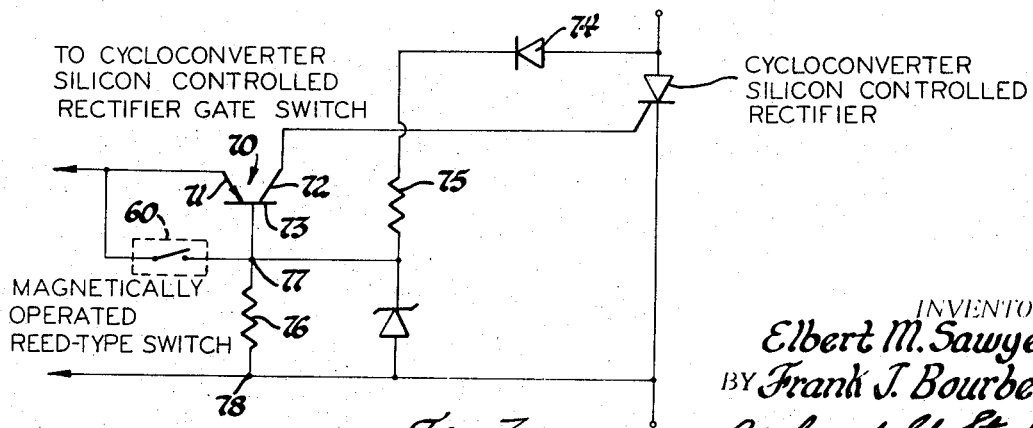

For a better understanding of the present invention, together with additional objects, advantages and features thereof, reference is made to the following description and accompanying drawings in which:

FIG. 1 sets forth a typical cycloconverter system for cyclically energizing the phase windings of a three-phase, alternating current motor from a three-phase, alternating current supply potential source in block form;

FIG. 2 sets forth a portion of FIG. 1 with the circuit of this invention incorporated therein; and FIG. 3 is a schematic diagram of a gate signal inhibit circuit suitable for use in the practice of this invention.

Referring to FIG. 1 of the drawings, a typical cycloconverter system for cyclically energizing the phase windings of a three-phase, alternating current motor 40, having three "wye" connected phase windings 40a, 40b and 40c and a rotor 41, from a three-phase, alternating current supply potential source 19, is set forth in block form. Phase windings 40a, 40b and 40c of motor 40 are cyclically energized through a cycloconverter circuit made up of a network of 18 silicon controlled rectifiers, referenced by the numerals 1 through 18, inclusive. Corresponding to each cycloconverter silicon controlled rectifier is a cycloconverter silicon controlled rectifier gate switch for producing a gate signal. In the interest of reducing drawing complexity, only six cycloconverter silicon controlled rectifier gate switches, which correspond to respective cycloconverter silicon controlled rectifiers 10 through 15, are shown in block form in FIG. 1 and referenced by the numerals 20 through 25. Any one of the silicon controlled rectifier gate switches well known in the art which produce an output potential signal may be employed as these cycloconverter silicon controlled rectifier gate switches which, per se, form no part of this invention. Should the cycloconverter silicon controlled rectifier gate signals be applied across the gate-cathode electrodes of any of the cycloconverter silicon controlled rectifiers while the magnitude of the alternating current supply potential appearing thereacross is high, 300 volts for example, the adjacent cycloconverter silicon controlled rectifier may experience a positive rate of change of approximately 300 volts per microsecond. This extremely high dv/dt may trigger the adjacent cycloconverter silicon controlled rectifier conductive through the anode-cathode electrodes thereof to place a direct short circuit across the supply potential source. To avoid this possibility, a gate signal inhibit circuit which prevents the application of a cycloconverter silicon controlled rectifier gate signal to a cycloconverter silicon controlled rectifier while the magnitude of the supply potential appearing thereacross is greater than a predetermined maximum may be disposed between each cycloconverter silicon controlled rectifier gate switch and the corresponding cycloconverter silicon controlled rectifier. In the interest of reducing drawing complexity, only six gate signal inhibit circuits, which correspond to respective cycloconverter silicon controlled rectifiers 10 through 15 are shown in block form in FIG. 1 and referenced by the numerals 30 through 35, inclusive. One example of a gate signal inhibit circuit suitable for use with this invention is schematically set forth in detail in FIG. 3 and will be explained later in this specification. This circuit has been shown and described in detail in copending application, Ser. No. 159,228, filed July 2, 1971, and assigned to the same assignee as is this application. So that silicon controlled rectifier gate signals may be applied to the proper cycloconverter silicon controlled rectifiers at the proper time, a rotor position sensor may be employed. The rotor position sensor may be of the type shown in the United States patents to Campbell et al., U.S. Pat. No. 3,320,565, and Huntzinger et al., U.S. Pat. No. 3,395,328, or to Kirk, U.S. Pat. No. 3,483,458, all of which are assigned to the assignee of this application. As the rotor position sensors, per se, form no part of this invention, the rotor position sensor is illustrated in FIG. 1 in block form and referenced by the numeral 26. The output signal of each of the rotor position sensors may be applied to a respective square wave generator which may be conventional bistable multivibrator circuits which convert the rotor position sensor pulse into a square waveform. The two square wave generators corresponding to phase winding 40a are shown in block form in FIG. 1 and referenced by the numerals 27 and 28. Any bistable multivibrator circuit well known in the art may be employed as these square wave generators which, per se, form no part of this invention. The output of square wave generator 27 is applied to the cycloconverter silicon controlled rectifier gate switches 20, 21 and 22 and the output of square wave generator 28 is applied to the cycloconverter silicon controlled rectifier gate switches 23, 24 and 25. With this arrangement, all of the cycloconverter silicon controlled rectifiers of the common anode group are simultaneously triggered and all of the cycloconverter silicon controlled rectifiers of the common cathode group are simultaneously triggered.

In cycloconverter systems of this type, two square wave generators, six gate inhibit circuits and six cycloconverter silicon controlled rectifier gate switches interconnected as shown in FIG. 1 for phase winding 40a of motor 40 are employed for each phase winding of the motor. As each of phase windings 40b and 40c of motor 40 require the same number of square wave generators, gate inhibit circuits and cycloconverter silicon controlled rectifier gate switches interconnected the same way as for phase winding 40a, in the interest of reducing drawing complexity, the details for motor phase windings 40b and 40c are not set forth in FIG. 1.

Assume that the common cathode group of cycloconverter silicon controlled rectifiers 13, 14 and 15, connected to the terminal end 42 of phase winding 40a, are simultaneously gated ON by respective cycloconverter silicon controlled rectifier gate switches 23, 24 and 25 acting through respective gate signal inhibit circuits 33, 34 and 35 and are conducting in turn, depending upon which of the three is at the most positive supply potential. Phase current will flow into terminal end 42 of phase winding 40a toward the neutral point "N". As the phase current through phase winding 40a decreases over the last 90° of the positive half cycles of the supply potential, a potential is induced in phase winding 40a of a polarity relationship, neutral point "N" positive with respect to terminal end 42, which will tend to maintain phase current flow in the same direction. Near the end of these half cycles, the cycloconverter silicon controlled rectifier gate switches 23, 24 and 25 remove the cycloconverter silicon controlled rectifier gate signals from respective cycloconverter silicon controlled rectifiers 13, 14 and 15 and silicon controlled rectifier gate switch 43 produces a gate signal which is applied across the gate-cathode electrodes of the silicon controlled rectifier 45 connected across phase winding 40a which is forward poled by the potential induced in phase winding 40a to trigger this device conductive through the anode-cathode electrodes thereof. Conducting silicon controlled rectifier 45 establishes a circuit through which the potential induced in phase winding 40a charges capacitor 46, which is later dissipated through parallel resistor 47. With the common anode group of cycloconverter silicon controlled rectifiers 10, 11 and 12, also connected to the terminal end 42 of phase winding 40a, simultaneously gated ON by respective cycloconverter silicon controlled rectifier gate switches 20, 21 and 22 acting through respective gate signal inhibit circuits 30, 31 and 32 and conducting in turn, phase current will flow into the neutral point "N" of phase winding 40a toward terminal end 42. As the phase current through phase winding 40a decreases over the last 90° of the negative half cycles of the supply potential, a potential is induced in phase winding 40a of a polarity relationship, terminal end 42 positive with respect to neutral point "N", which will tend to maintain phase current flow in the same direction. Near the end of these half cycles, the cycloconverter silicon controlled rectifier gate switches 20, 21 and 22 remove the cycloconverter silicon controlled rectifier gate signals from respective cycloconverter silicon controlled rectifiers 10, 11 and 12 and silicon controlled rectifier gate switch 53 produces a gate signal which is applied across the gate-cathode electrodes of the silicon controlled rectifier 55 connected across phase winding 40a which is forward poled by the potential induced in phase winding 40a to trigger this device conductive through the anode-cathode electrodes thereof. Conducting silicon controlled rectifier 55 establishes a circuit through which the potential induced in phase winding 40a charges capacitor 56, which is later dissipated through parallel resistor 57. Although only the circuitry associated with phase winding 40a of motor 40 is set forth in FIG. 1 and hereinabove briefly described, identical circuitry which operates in an identical manner is also associated with each of phase windings 40b and 40c. Consequently, by sensing the flow of phase current shunted through the silicon controlled rectifier, corresponding to silicon controlled rectifiers 45 and 55, connected across each phase winding of motor 40, substantially zero phase current may be detected.

The cycloconverter silicon controlled rectifier gate signal delay circuit of this invention for delaying the application of the cycloconverter silicon controlled rectifier gate signals to the cycloconverter silicon controlled rectifiers next to be gated conductive to energize, in the opposite direction, a phase winding of a cycloconverter operated motor through which conduction has just been terminated is comprised of two silicon controlled rectifiers, each having anode, cathode and gate electrodes, two capacitors and two resistors for each phase winding of the motor, a circuit for producing and applying a gate signal across the gate-cathode electrodes of the one of the silicon controlled rectifiers connected across the phase winding of the motor through which conduction is to be terminated which is forward poled by the potential induced in the phase winding as the magnitude of phase current flow therethrough decreases to gate this device conductive through the anode-cathode electrodes thereof and circuitry responsive to the flow of current through the forward poled silicon controlled rectifier for delaying the application of the cycloconverter silicon controlled rectifier gate signals to the cycloconverter silicon controlled rectifiers next to be gated conductive for energizing the same phase winding in the opposite direction until current flow through the silicon controlled rectifier has reduced to substantially zero.

A magnetically operated reed-type switch, having two normally open current carrying elements, corresponding to each cycloconverter silicon controlled rectifier magnetically coupled to the magnetic field produced by the flow of current through the conducting silicon controlled rectifier connected across the phase winding of the motor to which phase current is supplied through the cycloconverter silicon controlled rectifier to which it corresponds is responsive to the flow of current through that conducting silicon controlled rectifier. In FIG. 2 of the drawing, the six magnetically operated reed-type switches corresponding to cycloconverter silicon controlled rectifiers 10 through 15 through which current is supplied to phase winding 40a of motor 40 are referenced by the numerals 60 through 65, respectively. The magnetically operated reed-type switches 60, 61 and 62 which are responsive to the flow of current through silicon controlled rectifier 45 connected across phase winding 40a of motor 40 to which phase current is supplied by corresponding cycloconverter silicon controlled rectifiers 10, 11 and 12, respectively, is indicated in FIG. 2 to be magnetically coupled to a coil 48, which may be an air core coil, connected in series with the anode-cathode electrodes of silicon controlled rectifier 45 and the parallel combination of capacitor 46 and resistor 47. The magnetically operated reed-type switches 63, 64 and 65 which are responsive to the flow of current through silicon controlled rectifier 55 also connected across phase winding 40a of motor 40 to which phase current is supplied in the opposite direction through corresponding cycloconverter silicon controlled rectifiers 13, 14 and 15, respectively, is indicated in FIG. 2 to be magnetically coupled to a coil 58, which may be an air core coil, connected in series with the anode-cathode electrodes of silicon controlled rectifier 55 and the parallel combination of capacitor 56 and resistor 57. It is to be specifically understood, however, that alternate magnetic coupling of these magnetically operated reed-type switches to the magnetic field produced by the flow of current through the conducting silicon controlled rectifiers connected across the phase winding of the motor to which phase current is supplied by the corresponding cycloconverter silicon controlled rectifiers, such as a separate coil for each, may be employed without departing from the spirit of the invention. Each of phase windings 40b and 40c of motor 40 have identical associated circuitry which, in the interest of reducing drawing complexity, has not been shown in FIG. 2. Although magnetically operated reed-type switches have been set forth in this specification, it is to be specifically understood that other current sensitive devices such as Hall Effect elements, coupled transformer windings or saturable cores may be employed.

One example of suitable gate signal inhibit circuits, indicated in block form in FIGS. 1 and 2 and referenced by the numerals 30 through 35, is schematically set forth in detail in FIG. 3. The emitter electrode 71 and collector electrode 72 of type PNP transistor 70 are connected in series with the output of the associated cycloconverter silicon controlled rectifier gate switch and the gate electrode of the associated cycloconverter silicon controlled rectifier. Each cycloconverter silicon controlled rectifier gate signal produced by the associated cycloconverter silicon controlled rectifier gate switch is applied across the emitter electrode 71 and the base electrode 73 of type PNP transistor 70 in the proper polarity relationship to produce emitter-base and, consequently, emitter-collector current flow therethrough. With transistor 70 conducting through the emitter-collector electrodes, the cycloconverter silicon controlled rectifier gate signal is applied across the gate-cathode electrodes of the associated cycloconverter silicon controlled rectifier to trigger this device conductive. However, should the supply potential appearing across the anode-cathode electrodes of the associated cycloconverter silicon controlled rectifier be greater than a predetermined maximum, the flow of current through diode 74 and series resistors 75 and 76 would produce a potential drop across resistor 76 of a positive polarity upon junction 77 with respect to junction 78 and of a sufficient magnitude to prevent the cycloconverter silicon controlled rectifier gate signal from producing emitter-base current flow through type PNP transistor 70. Consequently, with these supply potential conditions, the cycloconverter silicon controlled rectifier gate signal would be inhibited and not applied across the gate-cathode electrodes of the associated cycloconverter silicon controlled rectifier.

The input transistor of the gate signal inhibit circuit also may be maintained not conductive through the emitter-collector electrodes by providing a short circuit across the control electrode and a selected one of the current carrying electrodes thereof. Therefore, a respective magnetically operated reed-type switch magnetically coupled to the magnetic field produced by the flow of current through the forward poled silicon controlled rectifier connected across the phase winding of the motor to which phase current is supplied by the cycloconverter silicon controlled rectifier to which it corresponds having two normally open current carrying elements connected across the control electrode and a selected one of the current carrying electrodes of the input transistor of each one of the gate signal inhibit circuits corresponding to the cycloconverter silicon controlled rectifiers next to be gated conductive to energize the same phase winding of the motor in the opposite direction may be employed. This connection is shown in FIG. 3.

Respective magnetically operated reed-type switch 60 magnetically coupled to the magnetic field produced by the flow of phase current through the forward poled silicon controlled rectifier 45 has its two normally open current carrying elements connected across the emitter-base electrodes of the input transistor of the gate signal inhibit circuit 30 corresponding to cycloconverter silicon controlled rectifier 10 next to be gated conductive to energize the same phase winding 40a of motor 40 in the opposite direction. Similarly, respective magnetically operated reed-type switches 61 and 62 also magnetically coupled to the magnetic field produced by the flow of phase current through forward poled silicon controlled rectifier 45 have the respective two normally open current carrying elements thereof connected across the emitter-base electrodes of the input transistor of each of gate signal inhibit circuits 31 and 32 corresponding to cycloconverter silicon controlled rectifiers 11 and 12 and respective magnetically operated reed-type switches 63, 64 and 65, magnetically coupled to the magnetic field produced by the flow of phase current through forward poled silicon controlled rectifier 55 have the respective two normally open current carrying elements thereof connected across the emitter-base electrodes of the input transistor of each of gate signal inhibit circuits 33, 34 and 35 corresponding to cycloconverter silicon controlled rectifiers 13, 14 and 15.

Each of phase windings 40a and 40b have identical circuitry associated therewith, however, in the interest of reducing drawing complexity, only the detailed circuitry for phase winding 40a has been shown in FIG. 2.

Just prior to the termination of conduction through phase winding 40a in a first direction from terminal end 42 toward neutral point "N", the magnitude of phase current flow therethrough decreases to induce a potential therein which forward poles silicon controlled rectifier 45, FIGS. 1 and 2. Consequently, the gate signal produced by silicon controlled rectifier gate switch 43, FIG. 1, when conduction through phase winding 40a in a first direction is to be terminated triggers silicon controlled rectifier 45 conductive through the anode-cathode electrodes thereof. Conducting silicon controlled rectifier 45 establishes a circuit through which the potential induced in phase winding 40a charges capacitor 46, which is later dissipated in parallel resistor 47, and shunts substantially all of the phase current around phase winding 40a through coil 48, FIG. 2. The magnetic field produced by this flow of charging current through coil 48 operates the two normally open contacts of each of magnetically operated reed-type switches 60, 61, and 62 to the closed condition to provide a short circuit across the emitter-base electrodes of the input transistor of each of gate inhibit circuits 30, 31, and 32, respectively. Consequently, cycloconverter silicon controlled rectifiers 10, 11 and 12 are not triggered conductive while this phase current is still present, When the phase current through coil 48 drops to a low value, the two normally open contacts of each of magnetically operated reed-type switches 60, 61 and 62 begin to open. The time delay in each of these magnetically operated reed-type switches is of sufficient duration to permit the phase current through silicon controlled rectifier 45 to reach zero before these normally open contacts are completely open. When the contacts of the reed switches have opened, the short circuit is removed from across the emitter-base electrodes of the input transistor of each of the associated gate signal inhibit circuits, consequentially, the cycloconverter silicon controlled rectifier gate signal is conducted therethrough and applied across the gate-cathode electrodes of the associated cycloconverter silicon controlled rectifier.

Just prior to the termination of conduction through phase winding 40a in the second opposite direction from neutral point "N" toward terminal end 42, the magnitude of phase current flow therethrough decreases to induce a potential therein which forward poles silicon controlled rectifier 55. Consequently, the gate signal produced by silicon controlled rectifier gate switch 153, FIG. 1, when conduction through phase winding 40a in the second opposite direction is to be terminated triggers silicon controlled rectifier 55 conductive through the anode-cathode electrodes thereof. Conducting silicon controlled rectifier 55 establishes a circuit through which the potential induced in phase winding 40a charges capacitor 56, which is later dissipated in parallel resistor 57. The magnetic field produced by this flow of charging current through coil 59 operates the two normally open contacts of each of magnetically operated switches 63, 64 and 65 to the closed condition to provide a short circuit across the emitter-base electrodes of the input transistor of each of gate inhibit circuits 33, 34 and 35, respectively. Consequently, cycloconverter silicon controlled rectifiers 13, 14 and 15 are not triggered conductive while this phase current is still present. When the phase current through coil 58 drops to a low value, the two normally open contacts of each of magnetically operated reed-type switches 63, 64 and 65 begin to open. However, the time delay in each of these magnetically operated reed-type switches is of sufficient duration to permit the phase current through silicon controlled rectifier 55 to reach zero before these normally open contacts are completely open. When the contacts of the reed switches have opened, the short circuit is removed from across the emitter-base electrodes of the input transistor of each of the associated gate signal inhibit circuits, consequently, the cycloconverter silicon controlled rectifier gate signal is conducted therethrough and applied across the gate-cathode electrodes of the associated cycloconverter silicon controlled rectifier.

Through the operation of the circuit of this invention, therefore, it is apparent that the application of cycloconverter silicon controlled rectifier gate signals to the cycloconverter silicon controlled rectifiers next to be gated conductive to energize, in the opposite direction, a phase winding of the cycloconverter operated motor through which conduction has just been terminated is delayed until the phase current has reduced to substantially zero.

While this description has been on the basis of detecting phase current through each of two silicon controlled rectifiers connected across each phase winding of the motor, it is to be specifically understood that the phase current may be sensed at another point without departing from the spirit of the invention.

While a preferred embodiment of the present invention has been shown and described, it will be obvious to those skilled in the art that various modifications and substitutions may be made without departing from the spirit of the invention which is to be limited only within the scope of the appended claims.

What is claimed is:

1. In a cycloconverter system for cyclically energizing the phase windings of an alternating current motor from an alternating current supply potential source having a cycloconverter circuit made up of a network of cycloconverter silicon controlled rectifiers through which the phase windings of the motor are energized and a silicon controlled rectifier gate switch for producing a cycloconverter silicon controlled rectifier gate signal corresponding to each cycloconverter silicon controlled rectifier, a cycloconverter silicon controlled rectifier gate signal delay circuit for delaying the application of the cycloconverter silicon controlled rectifier gate signals to the cycloconverter silicon controlled rectifiers next to be gated conductive to energize in the opposite direction a phase winding of the motor through which conduction has just been terminated until the phase current has reduced to substantially zero comprising, two silicon controlled rectifiers, each having anode, cathode and gate electrodes, for each said phase winding of said motor, two capacitors for each said phase winding of said motor, two resistors for each said phase winding of said motor, means for connecting said anode-cathode electrodes of one of said silicon controlled rectifiers in series with the parallel combination of one of said capacitors and one of said resistors and for connecting said anode-cathode electrodes of the other said silicon controlled rectifier in series with the parallel combination of the other said capacitor and the other said resistor across each phase winding of said motor with said silicon controlled rectifiers poled in an opposite polarity relationship, means for producing a gate signal when conduction through each one of said phase windings of said motor is to be terminated, means for applying said gate signal across said gate-cathode electrodes of the one of said silicon controlled rectifiers connected across the said phase winding of said motor through which conduction is to be terminated which is forward poled by the potential induced in the phase winding as the magnitude of phase current flow therethrough decreases to gate this device conductive through said anode-cathode electrodes, and means responsive to the flow of current through said forward poled silicon controlled rectifier for delaying the application of said cycloconverter silicon controlled rectifier gate signals to the said cycloconverter silicon controlled rectifiers next to be gated conductive for energizing the same phase winding in the opposite direction until current flow through said silicon controlled rectifier has reduced to substantially zero.

2. In a cycloconverter system for cyclically energizing the phase windings of an alternating current motor from an alternating current supply potential source having a cycloconverter circuit made up of a network of cycloconverter silicon controlled rectifiers through which the phase windings of the motor are energized and a silicon controlled rectifier gate switch for producing a cycloconverter silicon controlled rectifier gate signal corresponding to each cycloconverter silicon controlled rectifier, a cycloconverter silicon controlled rectifier gate signal delay circuit for delaying the application of the cycloconverter silicon controlled rectifier gate signals to the cycloconverter silicon controlled rectifiers next to be gated conductive to energize in the opposite direction a phase winding of the motor through which conduction has just been terminated until the phase current has reduced to substantially zero comprising, two silicon controlled rectifiers, each having anode, cathode and gate electrodes, for each said phase winding of said motor, two capacitors for each said phase winding of said motor, two resistors for each said phase winding of said motor, at least two coils for each said phase winding of said motor, means for connecting said anode-cathode electrodes of one of said silicon controlled rectifiers and one of said coils in series with the parallel combination of one of said capacitors and one of said resistors and for connecting said anode-cathode electrodes of the other said silicon controlled rectifier and the other said coil in series with the parallel combination of the other said capacitor and the other said resistor across each phase winding of across each said motor with said silicon controlled rectifiers poled in an opposite polarity relationship, means for producing a gate signal when conduction through each one of said phase windings of said motor is to be terminated, means for applying said gate signal across said gate-cathode electrodes of the one of said silicon controlled rectifiers connected across the said phase winding of said motor through which conduction is to be terminated which is forward poled by the potential induced in the phase winding as the magnitude of phase current flow therethrough decreases, and means responsive to the flow of current through the one of said coils connected in series with said forward poled silicon controlled rectifier for delaying the application of said cycloconverter silicon controlled rectifier gate signals to the said cycloconverter silicon controlled rectifiers next to be gated conductive for energizing the same phase winding in the opposite direction until current flow through said coil has reduced to substantially zero.

3. In a cycloconverter system for cyclically energizing the phase windings of an alternating current motor from an alternating current supply potential source having a cycloconverter circuit made up of a network of cycloconverter silicon controlled rectifiers through which the phase windings of the motor are energized and a silicon controlled rectifier gate switch for producing a cycloconverter silicon controlled rectifier gate signal and a gate signal inhibit circuit including an input transistor having a control and two current carrying electrodes corresponding to each cycloconverter silicon controlled rectifier, a cycloconverter silicon controlled rectifier gate signal delay for delaying the application of the cycloconverter silicon controlled rectifier gate signals to the cycloconverter silicon controlled rectifiers next to be gated conductive to energize in the opposite direction a phase winding of the motor through which conduction has just been terminated until phase current has reduced to substantially zero comprising, two silicon controlled rectifiers, each having anode, cathode and gate electrodes, for each said phase winding of said motor, two capacitors for each said phase winding of said motor, two resistors for each said phase winding of said motor, means for connecting said anode-cathode electrodes of one of said silicon controlled rectifiers in series with the parallel combination of one of said capacitors and one of said resistors and for connecting said anode-cathode electrodes of the other said silicon controlled rectifier in series with the parallel combination of the other said capacitor and the other said resistor across each phase winding of said motor with said silicon controlled rectifiers poled in an opposite polarity relationship, means for producing a gate signal when conduction through each one of said phase windings of said motor is to be terminated, means for applying said gate signal across said gate-cathode electrodes of the one of said silicon controlled rectifiers connected across the said phase winding of said motor through which conduction is to be terminated which is forward poled by the potential induced in the phase winding as the magnitude of phase current flow therethrough decreases, and a respective magnetically operated reed-type switch magnetically coupled to the magnetic field produced by the flow of phase current through said forward poled silicon controlled rectifier having two normally open current carrying elements connected across said control electrode and a selected one of said current carrying electrodes of said input transistor of each one of said gate signal inhibit circuits corresponding to the said cycloconverter silicon controlled rectifiers next to be gated conductive to energize the same phase winding of the motor in the opposite direction.

4. In a cycloconverter system for cyclically energizing the phase windings of an alternating current motor from an alternating current supply potential source having a cycloconverter circuit made up of a network of cycloconverter silicon controlled rectifiers through which the phase windings of the motor are energized and a silicon controlled rectifier gate switch for producing a cycloconverter silicon controlled rectifier gate signal and a gate signal inhibit circuit including an input transistor having a control and two current carrying electrodes corresponding to each cycloconverter silicon controlled rectifier, a cycloconverter silicon controlled rectifier gate signal delay circuit for delaying the application of the cycloconverter silicon controlled rectifier gate signals to the cycloconverter silicon controlled rectifiers next to be gated conductive to energize in the opposite direction a phase winding of the motor through which conduction has just been terminated until the phase current has reduced to substantially zero comprising, two silicon controlled rectifiers, each having anode, cathode and gate electrodes, for each said phase winding of said motor, two capacitors for each said phase winding of said motor, two resistors for each said phase winding of said motor, at least two coils for each said phase winding of said motor, means for connecting said anode-cathode electrodes of one of said silicon controlled rectifiers and one of said coils in series with the parallel combination of one of said capacitors and one of said resistors and for connecting said anode-cathode electrodes of the other said silicon controlled rectifier and the other said coil in series with the parallel combination of the other said capacitor and the other said resistor across each phase winding of said motor with said silicon controlled rectifiers poled in an opposite polarity relationship, means for producing a gate signal when conduction through each one of said phase windings of said motor is to be terminated, means for applying said gate signal across said gate-cathode electrodes of the one of said silicon controlled rectifiers connected across the said phase winding of said motor through which conduction is to be terminated which is forward poled by the potential induced in the phase winding as the magnitude of phase current flow therethrough decreases, and a respective magnetically operated reed-type switch magnetically coupled to the magnetic field produced by the flow of current through the one of said coils connected in series with said forward poled silicon controlled rectifier having two normally open current carrying elements connected across said control electrode and a selected one of said current carrying electrodes of said input transistor of each one of said gate signal inhibit circuits corresponding to the said cycloconverter silicon controlled rectifiers next to be gated conductive to energize the same phase winding of the motor in the opposite direction.

* * * * *

PO-1050
(5/69)

UNITED STATES PATENT OFFICE
CERTIFICATE OF CORRECTION

Patent No. 3,689,813  Dated September 5, 1972

Inventor(s) Elbert M. Sawyer and Frank J. Bourbeau

It is certified that error appears in the above-identified patent and that said Letters Patent are hereby corrected as shown below:

Column 10, line 16, "59" should read -- 58 --.

Column 12, line 11, delete "across each".

Signed and sealed this 15th day of May 1973.

(SEAL)
Attest:

EDWARD M. FLETCHER, JR.
Attesting Officer

ROBERT GOTTSCHALK
Commissioner of Patents